(12) United States Patent
Kaplan et al.

(10) Patent No.: US 11,954,026 B1
(45) Date of Patent: Apr. 9, 2024

(54) PAGING HIERARCHIES FOR EXTENDED PAGE TABLES AND EXTENDED PAGE ATTRIBUTES

(71) Applicant: ADVANCED MICRO DEVICES, INC., Santa Clara, CA (US)

(72) Inventors: David Kaplan, Austin, TX (US); David S. Christie, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 179 days.

(21) Appl. No.: 16/572,833

(22) Filed: Sep. 17, 2019

Related U.S. Application Data

(60) Provisional application No. 62/732,925, filed on Sep. 18, 2018.

(51) Int. Cl.
| | |
|---|---|
| *G06F 12/00* | (2006.01) |
| *G06F 9/455* | (2018.01) |
| *G06F 12/06* | (2006.01) |
| *G06F 12/1009* | (2016.01) |
| *G06F 13/00* | (2006.01) |

(52) U.S. Cl.
CPC ...... *G06F 12/0615* (2013.01); *G06F 9/45558* (2013.01); *G06F 12/1009* (2013.01); *G06F 2009/45583* (2013.01); *G06F 2212/151* (2013.01); *G06F 2212/152* (2013.01)

(58) Field of Classification Search
CPC ............ G06F 12/0615; G06F 12/1009; G06F 9/45558; G06F 2212/151; G06F 2212/152; G06F 2209/45583
USPC .............................................................. 711/2
See application file for complete search history.

(56) References Cited

U.S. PATENT DOCUMENTS

| | | | |
|---|---|---|---|
| 6,671,791 B1 | 12/2003 | McGrath | |
| 8,099,581 B2* | 1/2012 | Bennett | G06F 12/0875 711/206 |
| 8,533,428 B2* | 9/2013 | Bennett | G06F 12/109 711/206 |
| 2008/0301398 A1* | 12/2008 | Falik | G06F 12/1027 711/206 |
| 2009/0172243 A1* | 7/2009 | Champagne | G06F 12/1009 711/3 |
| 2012/0226850 A1* | 9/2012 | Nakanishi | G06F 12/1009 711/102 |
| 2013/0262736 A1* | 10/2013 | Kegel | G06F 12/1081 711/3 |
| 2013/0339659 A1* | 12/2013 | Bybell | G06F 12/1009 711/207 |
| 2016/0140048 A1* | 5/2016 | Mukherjee | G06F 12/128 711/135 |
| 2016/0246732 A1* | 8/2016 | Shanbhogue | G06F 12/1009 |
| 2016/0335194 A1* | 11/2016 | Eddy | G06F 12/1009 |
| 2017/0097898 A1* | 4/2017 | Durham | G06F 12/1475 |
| 2017/0371803 A1* | 12/2017 | Zmudzinski | G06F 12/1475 |

(Continued)

*Primary Examiner* — Sheng Jen Tsai

(57) ABSTRACT

A processing system includes a processor core for processing instructions and a memory that stores a page table set including an extended page table having an extended page table entry storing extended page table attributes associated with a physical memory page. The system receives a virtual address and translates the virtual address to a physical address for the physical memory page. One or more extended page attributes associated with the physical memory page are retrieved from the extended page table entry based on the virtual address.

19 Claims, 9 Drawing Sheets

(56) References Cited

U.S. PATENT DOCUMENTS

| | | | |
|---|---|---|---|
| 2018/0067866 A1* | 3/2018 | Shanbhogue | G06F 11/0712 |
| 2018/0074969 A1* | 3/2018 | Neiger | G06F 12/145 |
| 2018/0150406 A1* | 5/2018 | John | G06F 12/0802 |
| 2018/0189190 A1 | 7/2018 | Kaplan et al. | |
| 2019/0026232 A1* | 1/2019 | Warkentin | G06F 12/1036 |
| 2019/0042463 A1* | 2/2019 | Shanbhogue | G06F 21/53 |
| 2020/0201786 A1* | 6/2020 | Ouziel | G06F 12/0828 |
| 2020/0257828 A1* | 8/2020 | Durham | G06F 9/45533 |

* cited by examiner

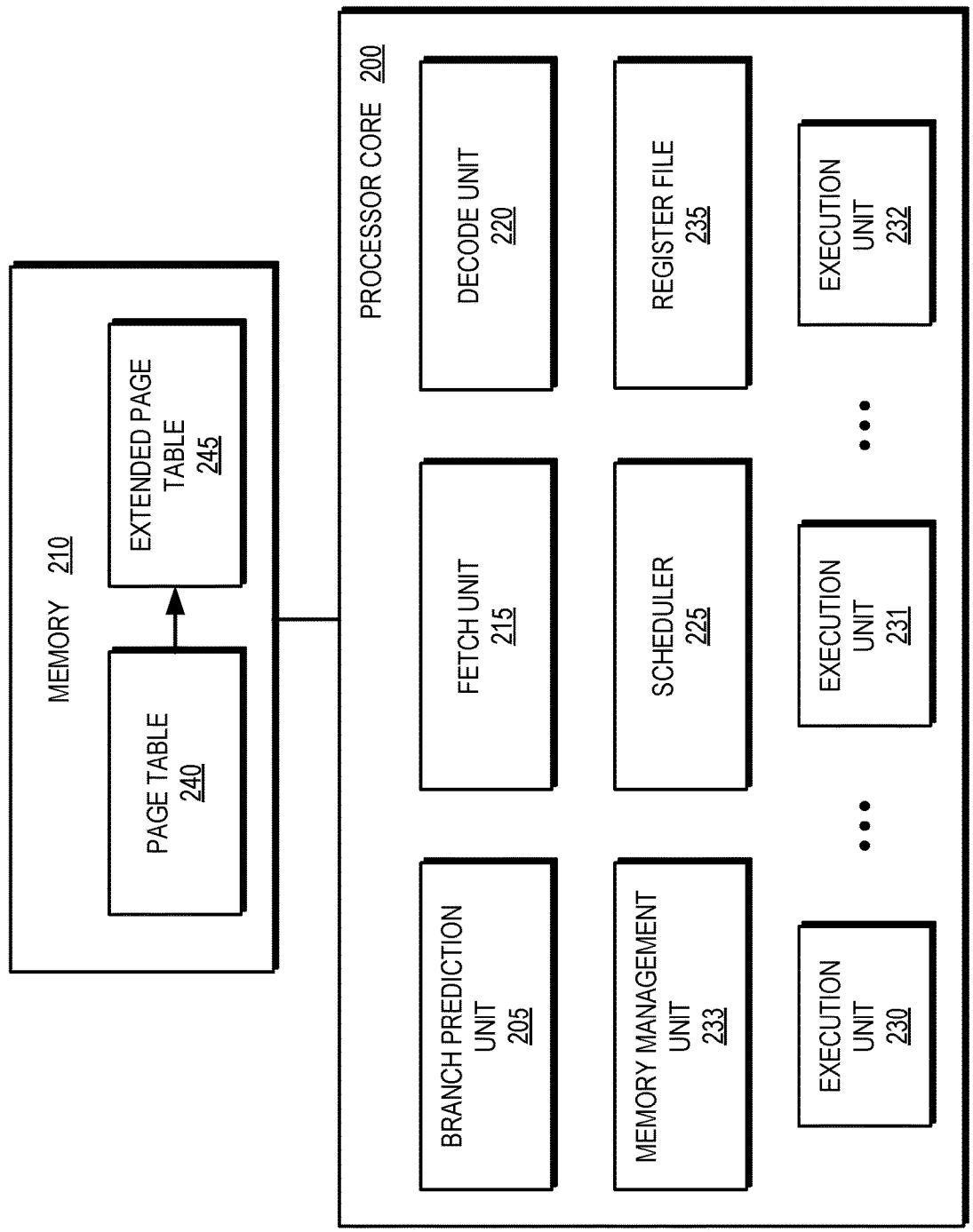

PAGING HIERARCHIES FOR EXTENDED PAGE TABLES AND EXTENDED PAGE ATTRIBUTES

CROSS-REFERENCE TO RELATED APPLICATIONS

The present application is related to and claims priority to the following application, the entirety of which is incorporated by reference herein: U.S. Provisional Patent Application Ser. No. 62/732,925, titled "ADDITIONAL CONTROL BITS FOR A PAGING HIERARCHY," filed Sep. 18, 2018.

BACKGROUND

Processing units, such as central processing units (CPUs), graphics processing units (GPUs), accelerated processing units (APUs), and the like, often implement software to perform various functions. As it executes, the software accesses data and instructions in memory using virtual addresses that are mapped to physical addresses of memory devices using a page table. Each entry in the page table stores a mapping of a virtual address to a corresponding physical address, e.g., an address of a particular page of a physical memory. Entries in the page table also typically include information indicating other attributes of the referenced page such as: an NX bit that indicates whether code stored in the page is available for execution, a dirty bit or a modified bit that indicates whether information in the page has been changed, and a present bit to indicate whether the page is stored in memory or stored on an external disk. However, conventional page tables are relatively inflexible and support limited information.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

FIG. 2 is a block diagram of a processor core and associated memory including a page table and an extended page table according to some embodiments.

DETAILED DESCRIPTION

FIGS. 1-10 disclose embodiments of techniques that enhance features and security of a page of memory and page table for the page by adding one or more additional levels to a memory paging hierarchy. The additional levels are supported by extended page attributes (XPAs) that provide additional bits for each memory page without having to create additional structures in a processing unit to access the additional levels. For example, XPAs provide an additional number of control bits per page and thereby enable security features that operate at a memory page level. As described further herein, in some embodiments, the XPA bits store permissions and attributes that are enabled on a per-page basis or at another level of granularity. An existing page table entry (PTE) points to an extended page table (XPT) that includes entries holding the additional attributes. The entries include, by way of example, a physical page base address, present bits, bits indicating an actual memory type, and a protection key. In a processing system, hardware or software, or a combination of hardware and software, uses bits in a leaf entry of the page table as a pointer to the extended page table. The virtual address bits used to index the PTE are reused as an index into the extended page table and entries are read from the extended page table to identify a physical address of the page, a memory type, and other page attributes. For example, the physical page base address is used to find the physical memory page during a table-walk of the memory paging hierarchy.

Figure 1:
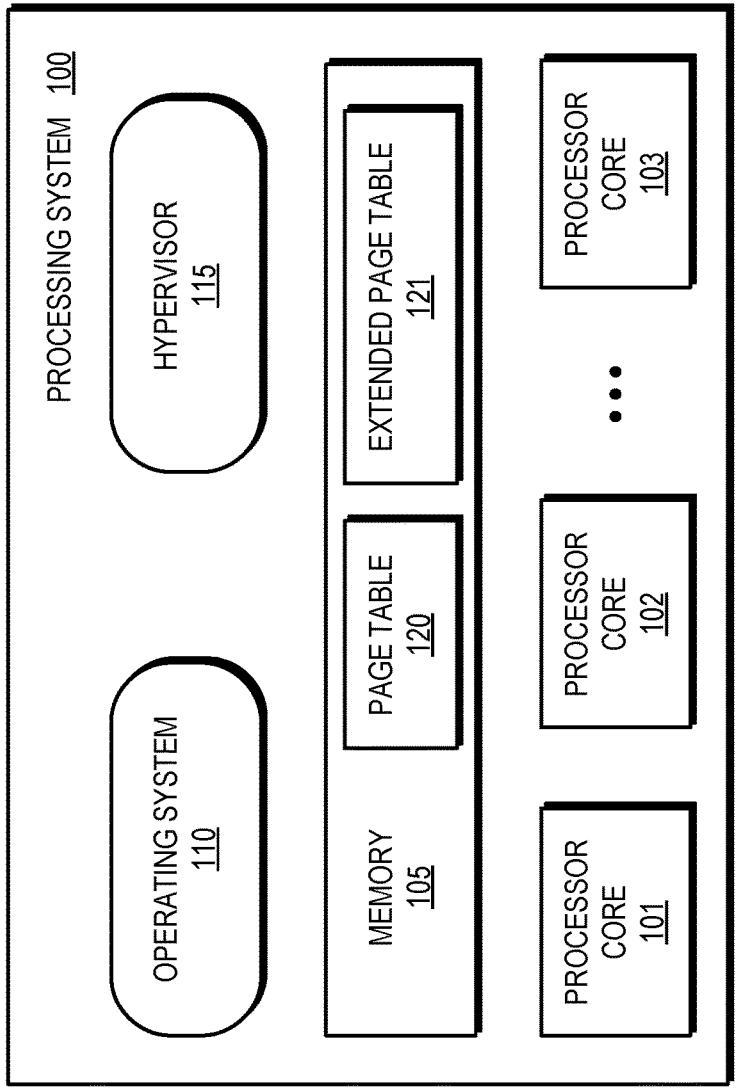
FIG. 1 is a block diagram of a processing system that implements extended page table attributes according to some embodiments.

FIG. 1 is a block diagram of a processing system 100 that implements extended page table attributes according to some embodiments. The processing system 100 implements one or more processor cores 101, 102, 103, which are collectively referred to herein as "the processor cores" 101-103. The processor cores 101-103 execute instructions that are stored in a memory 105. Some embodiments of the memory 105 are implemented as dynamic random access memory (DRAM). The memory 105 includes or has access to a page table 120 and the memory 105 makes access requests to the memory. Some embodiments of the page table 120 include entries that are pointers to an extended page table 121 that include entries for extended page attributes, as discussed herein.

The processor cores 101-103 access the instructions using physical addresses, virtual addresses, or addresses of cache lines in embodiments that implement caching of instructions in a cache (not shown in FIG. 1). Results of the instructions executed by the processor cores 101-103 are stored in the memory 105. The processor cores 101-103 execute instructions sequentially, concurrently, or in parallel with each other. The privilege level of a process executing on one of the processor cores 101-103, a guest/hypervisor status of the process and other context states are known and controlled by a management layer including an operating system (OS) 110 for the processing system 100 or a hypervisor 115 of one or more virtual machines that are executing in the processing system 100. For sake of convenience, the OS 110 and the hypervisor 115 are illustrated separately from the memory 105 but exist during execution of instructions stored in a memory of the processing system 100. One or more values in the extended page table 121 control how one or more of the processing system 100, the OS 110, and the hypervisor 115 operate on data and instructions in the memory 105.

FIG. 2 is a block diagram of a processor core 200 according to some embodiments. The processor core 200 is used to implement some embodiments of the processor cores 101-103 shown in FIG. 1. The processor core 200 is associated with a memory 210 that includes a page table 240 and an extended page table 245 according to some embodiments. One or more values in the extended page table 245 control how one or more components of the processor core 200 operate on data and instructions in the memory 210.

The processor core 200 includes a branch prediction unit 205 that provides addresses of locations in the memory 210 to a fetch unit 215. Some embodiments of the branch prediction unit 205 include a branch target buffer (BTB) or indirect target predictor. The memory 210 is used to implement some embodiments of the memory 105 shown in FIG. 1. The fetch unit 215 reads bytes representing an instruction from a cache or the memory 210 and sends the instruction to a decode unit 220. The decode unit 220 examines the instruction bytes and determines the function of the instruction. The decode unit 220 translates (i.e., decodes, interprets) the instruction to generate a series of operations to be performed by the processor core 200. These operations are written to a scheduler 225. The scheduler 225 determines when source values for an operation are ready and sends the source values to one or more execution units 230, 231, 232, which are collectively referred to herein as "the execution units" 230-232, to perform the operation. A result is written back to a register file 235. In certain embodiments, the processor core 200 includes other structures as needed to complete execution of the instructions at the execution units 230-232. For example, the processor core 200 includes or has access to a memory management unit (MMU) 233. The MMU 233 is a virtual-to-physical memory address unit. The MMU 233 includes certain structures and components to assist in performing virtual-to-physical address translations including one or more translation look-aside buffers (TLBs), which are not shown in FIG. 2 in the interest of clarity. The one or more TLBs cache recently translated addresses. For example, a tag of a TLB entry of a TLB holds a portion of a recently-translated virtual address and a data portion of the TLB entry holds a physical page address and other status information for the physical page that results from performing a table-walk to the extended page table 121.

The memory 210 includes or has access to one or more page tables 240 that are used to store mappings of virtual addresses to physical addresses in the memory 210. In some embodiments, the MMU 233 translates virtual addresses to physical addresses using information stored in the page tables 240. The virtual addresses extend a virtual address set that is larger than a physical memory set for use by processes and instructions that are executed by the processor core 200. The virtual address set is maintained by software such as the OS 110. The mappings from virtual to physical memory are used by software instructions executing on the processor core 200. In some embodiments, one page table 240 is provided for each thread or each process executing on the processor core 200. The page tables 240 include hypervisor mode tables, nested page tables, and the like. The memory 210 also includes or has access to one or more extended page tables 245 to hold additional paging control bits to store permissions and attributes such as XPAs. The attributes stored in the extended page table 245 are enabled on a per-page basis. In some embodiments, the XPAs are optional in a memory of a device with respect to, for example, an outcome of an execution of a software program instruction set but the XPAs provide additional functionality for more efficient and more secure processing in the processor core 200.

An existing page table entry in the page table 240 points to the extended page table 245. The extended page table 245 includes extended page table entries (XPTEs) that hold the XPAs. In some embodiments, the XPAs include one or more bits per additional attribute including: present bits, bits indicating an actual memory type, a physical page base address, and a protection key. The processor core 200 or other hardware uses bits in a leaf entry of the page table 240 as a pointer to a respective extended page table 245. Previous bits are used as an index into the extended page table 245 and entries are read from the extended page table 245 to identify a physical address of the page in the memory 210, a memory type, and other page attributes.

The extended page table 245 adds another level to a paging hierarchy to hold the additional page control bits. For example, the XPTE includes additional page attributes, an actual memory type (often abbreviated "memtype"), and expansion bits for additional page attributes beyond conventional page attributes, which are collectively referred to as the XPAs. The following embodiments are further examples and features associated with the XPAs. Use of the XPAs is a feature provided to processors and processing systems such as the processing system 100. To facilitate XPAs in the memory 210, a memory type is designated to support the XPAs such as at a time of allocating a memory page for instructions executing in a processing system. For example, the new memory type is an extended page table memtype. The new memtype is designated in one of a set of programmable processor-model-specific registers (MSRs) which are special registers provided by processors such as the processing system 100. In some embodiments, an XPA memtype is selected via a page attribute table (PAT) of the processing system 100 in support of page tables such as the page table 240. Pages use the XPAs by selecting or designating the XPA memtype. When XPA-enable is selected for a particular page, the existing page table entry in the page table 240 points to its extended page table 245 as further explained below.

By way of example, each extended page table 245 is four KB (kilobytes) in size and includes 512 extended page table entries (XPTEs) that are each 8B (eight bytes) in size and aligned at their respective boundaries. When the XPA memtype is not selected for a page, existing paging mechanisms remain in the processing system 100. In some embodiments, the XPAs are accessed by one or more global control registers (CRs) in the processing system 100. By way of example, a global fourth CR, also known as CR4, includes a particular extended enable bit designated as CR4.XPA where a value of 1 indicates that XPTEs are enabled and a value of 0 indicates that XPTEs are not enabled for a particular page. The XPTEs are supported in guest page tables, nested page tables, or a combination of guest page tables and nested page tables. Nested page tables are generally hypervisor-controlled page tables and using nested page tables is sometimes referred to as a form of second level address translation because an additional level of address virtualization is needed to track pages for hypervisor activities operating on a device sharing one set of memory structures.

Figure 3:
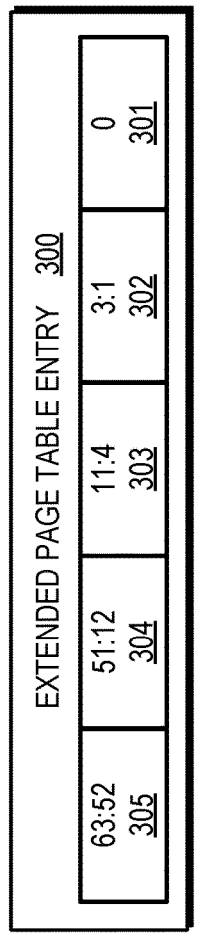
FIG. 3 illustrates a block diagram of an example of an extended page table entry (XPTE) in the system of FIG. 2.

FIG. 3 illustrates a block diagram of an example of an XPTE 300 in the extended page table 245. Each XPTE 300 is eight bytes corresponding to 64 bits having indices and each XPTE includes the following fields as shown in the XPTE 300. At position [0] 301, the XPTE has a "present" bit where a value of 1 corresponds to the physical page being present (translation is valid). A value of 0 corresponds to the page not being present (translation not valid), in which case the remaining bits at positions [62:1] are ignored by the hardware device, and a page fault (PF) is triggered when the entry is accessed during a table walk. Positions [3:1] 302 of the XPTE 300 are designated for an actual memory type field (referred to as memtype) and are used directly or as an index to a page attribute table depending on the embodiment. Positions [11:4] 303 and positions [63:52] 305 are generally user defined and are used according to rules operative in a program or set of instructions controlled by the OS 110, or used by the OS 110, the hypervisor 115, or other component. Positions [51:12] 304 of the XPTE 300 are designated for a physical page base address.

In some embodiments, properties of a page are coded by the bits in the positions 301-305 of the XPTE 300 and these bits control whether the page is executable under certain circumstances. By way of example, certain bits code for a protection domain to which the page belongs to. In an x86 architecture, certain bits such as positions [62:59] of the XPTE 300 are designated for a protection key (PK), such as a memory protection key (MPK). In certain embodiments, the MPK provides address space isolation and the CR4 supports both a CR4.PKE (PK enable) bit or field, and a CR4.XPKE bit or field where XPKE refers to extended PK enable. The MPK supports different zones of memory with permissions and attributes controlled by a separate register named a PKRU register to distinguish from other CR registers where the PKRU register has a set of respective bits for the respective zones and "U" refers to user or user space of execution, "K" refers to kernel, and "R" refers to register. Permissions and attributes apply to data-accesses of user mode pages. The MPKU register is an example of a register that provides page-level protections such as access disable and write disable that can be set or unset for the respective target of the protections. In some embodiments, the PKRU register is thread-local and gives each associated thread a different set of protections from other threads. In terms of access, the MPK supports validity checking of valid access rights with three or more states such as: a no access state, a read-only state, and a read-write state. These states are communicated or tracked via a set of bits (e.g., two bits, three bits, four bits). In some embodiments, an MPK-style function in kernel mode is also supported with a second set of protection key rights based on a supervisor (PKRS) register and its set of bits (e.g., 16 bits, 32 bits, and 64 bits). A similar scheme of protection is used in other processor architectures depending on a number of bits per byte or other limitation consistent with the positions 301-305 of the XPTE 300. In some embodiments, protection keys coded in certain bits of the XPTE 300 control access to the physical memory page associated therewith without requiring modification of the page tables compared to previous page tables. In effect, XPKE relocates the MPK field from the conventional PTE, where it potentially conflicts with OS software uses of those bits, to the XPTE to avoid such conflict. As an alternative to an XPKE bit in CR4, some embodiments provide that when the MPK capability is enabled by CR4.PKE and XPA is enabled by CR4.XPA, the MPK keys are unconditionally contained only in XPTEs and not in PTEs.

Figure 4:
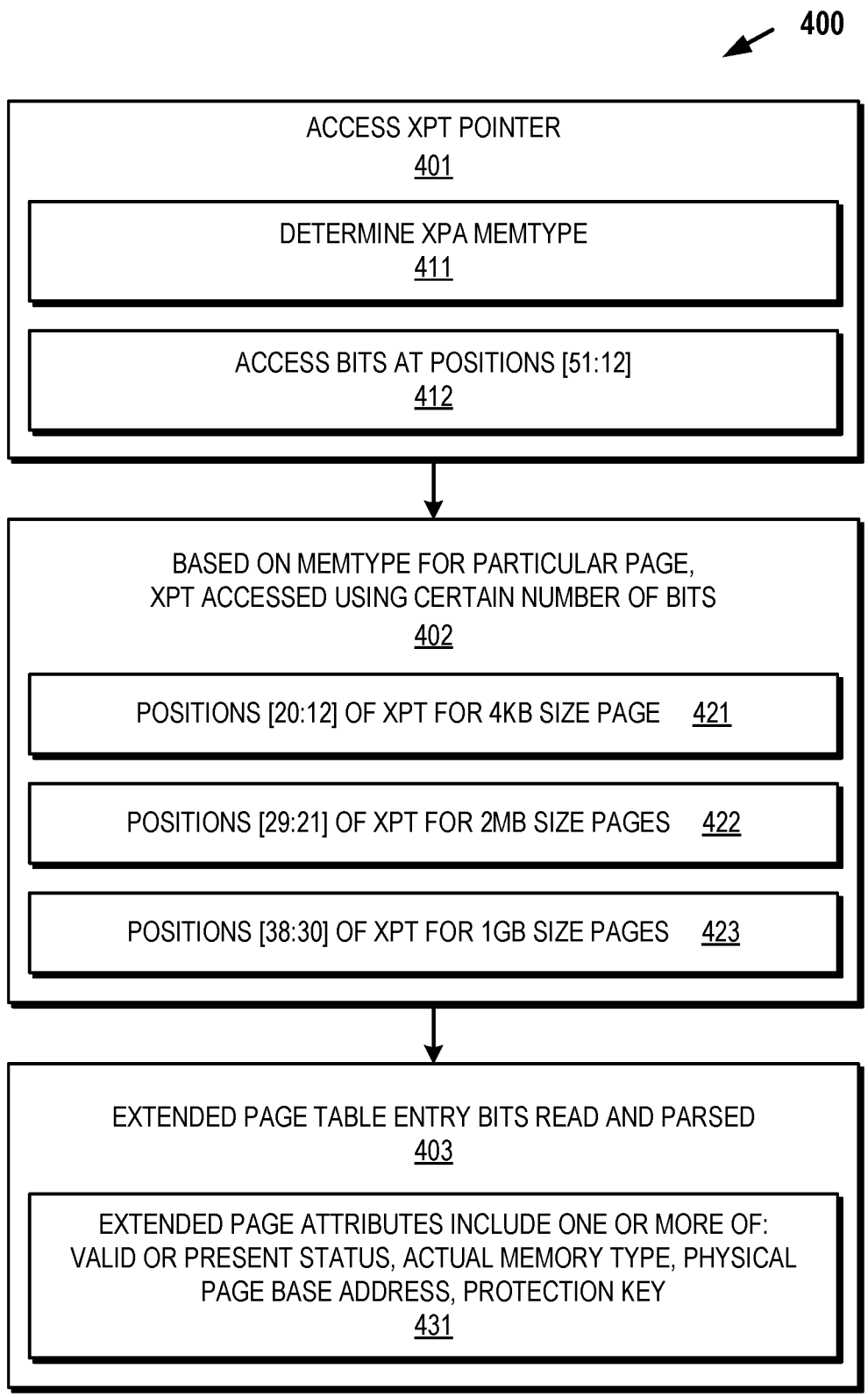
FIG. 4 is a block diagram of a method for selecting an extended page attribute (XPA) memtype and obtaining extended page attributes when reaching a page table entry according to some embodiments.

In use, upon reaching a page table entry with a corresponding XPTE, certain bits are accessed and a memtype is determined along with any other available information that has been stored therein. The processing system 100 performs certain steps as part of a process to access the page itself after performing an address translation between a virtual memory page address and physical memory page address. FIG. 4 is a block diagram of a method 400 for determining an XPA memtype and obtaining extended page attributes when reaching a leaf page table entry according to some embodiments. In this method 400, at least three steps are performed. First, at block 401, an XPT pointer is accessed from the PTE, and this XPT pointer points to an extended page table and one or more of its XPTEs regardless of leaf page size. For example, at block 411, positions [51:12] of the leaf entry are accessed and a memtype is determined. When the PTE has an XPA memtype, at block 412 the bits therein are read to find a location of the XPT. At block 402, based on the identity of the memtype as XPA for the particular page, the XPT itself is indexed and accessed using a certain number of bits (e.g., nine virtual address (VA) bits from a virtual address to be translated into a physical address). By way of example, at block 421, positions [20:12] of the XPT are used for 4K size pages. At block 422, positions [29:21] of the XPT are used for 2 MB size pages. And, at block 423, positions [38:30] of the XPT are used for one GB size pages. Third, at block 403, certain bits of the XPTE are read and parsed to obtain extended page table attributes coded in the bits. For example, eight bytes (64 bits) are read and parsed to find values for XPAs. By way of example, at block 431, XPAs include one or more of a valid or present status, an actual memory type, a physical page base address, and a protection key. In some embodiments, all XPA mappings within a single page table use a same XPT.

Figure 5:
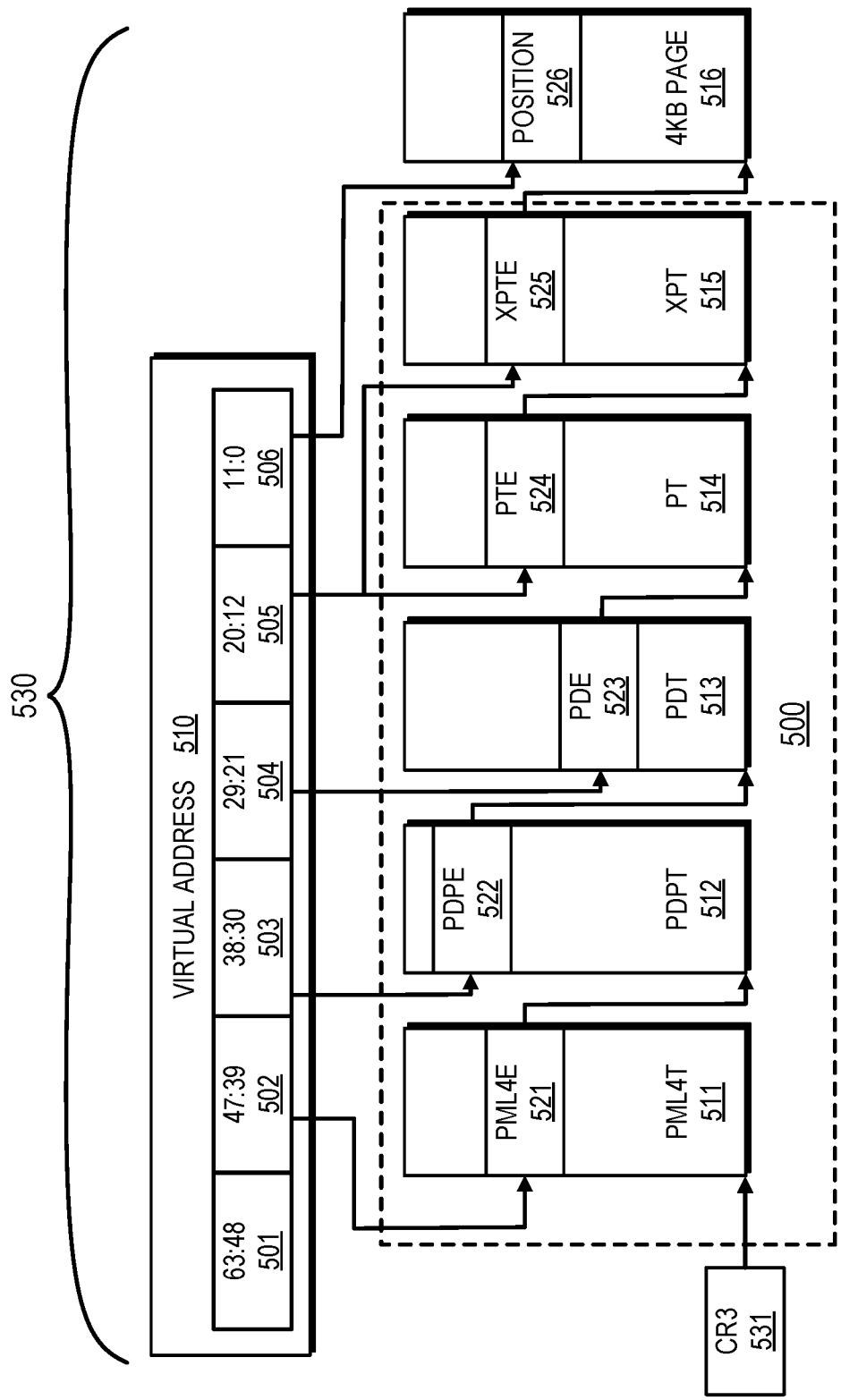
FIG. 5 is a block diagram of a page table set and paging hierarchy for an extended page attribute table-walk for a relatively small page size according to some embodiments.

FIG. 5 is a block diagram of a page table set 500 and paging hierarchy 530 for an extended page attribute table-walk for a four KB size page 516 according to some embodiments. The page table set 500 includes five page tables 511-515. As described above in reference to the extended page table 245, a computing device uses a hierarchy of page tables such as the paging hierarchy 530 for performing address translations between virtual memory page addressing and physical memory page addressing. When translation information for an access is not found in the TLB, the tables are referenced each in turn in the manner detailed below, in a manner known in the art and referred to as a page table walk (herein also referred to simply as a table-walk). In the course of translating an address for reference by an instruction, this table-walk is conducted by the MMU (e.g., an MMU unit, an MMU hardware component), or in some embodiments is conducted by a software- or microcode-based MMU-assist routine. Operating system software may, in the course of managing memory assignments, also perform this table walk in order to translate an address or to access a page table entry at a desired level of table. When machine virtualization is in use, the nested (second-stage) page table hierarchy operates in the same or similar manner. The page table set 500 uses a modified table-walk to access the XPT entries, and each table access is a step in the table-walk. When a hardware component performs the table-walk in order to access the XPT, the addressing involves direct use of physical addresses and no virtual-to-physical mapping is needed. Other mechanisms for performing a table-walk are illustrated in at least FIGS. 7 and 8 and described in relation thereto.

The page table set 500 includes a page map level-4 table (PML4T) 511, a page directory pointer table (PDPT) 512, a page directory table (PDT) 513, a page table (PT) 514, and an extended page table (XPT) 515. The XPT 515 is a last table of the page table set 500. The PML4T 511, the PDPT 512, the PDT 513, and the PT 514 are data structures (e.g., tables, linked lists) that are stored in a memory such as the memories 105, 210. The PML4T 511 is an x86 architecture specific name for a fourth level table relative to the page table 514 that includes fourth level entries for use and coordination with the PDPT 512 and entries therein. The fourth level table is a first table accessed in the page table set 500. The PML4T 511, the PDPT 512, the PDT 513, and the PT 514 each include information about a subsequent table to be accessed or "walked" during a next step of a table-walk to ultimately find a physical address corresponding to a virtual address 510. For example, the PML4T 511 includes a number of PML4T entries, referred to PML4Es, of which PML4E 521 is representative. PML4E 521 includes information mapping address bits 502 from the virtual address 510 to page directory pointer tables such as the PDPT 512. The PDPT 512 is a second table in the page table set 500. In general the page table set 500 includes physical addresses indicating particular memory pages associated with corresponding subsets of the virtual address 510 where the subsets of the virtual address 510 are labeled as blocks 501-506. The memory page 516 is a specific page in physical memory indicated by the virtual address 510 where data are located.

In some embodiments, when performing a table-walk in the page table set 500, in order to acquire a physical address that is associated with the virtual address 510, a table walker (e.g., an MMU component, an MMU hardware device, an MMU-assist routine) first reads a control register 531 (e.g., a third CR labeled "CR3") to determine a location, in memory, of a page map level-4 table (e.g., PML4T 511) associated with its corresponding virtual machine or process executing on the processing system. In some embodiments, the control register 531 is a page directory base register and its contents points to a base address of a page table. Also in some embodiments the upper virtual address bits 501 are not implemented and hence do not participate in address translation. The table walker then accesses the PML4T 511 using a second subset of bits 502 from the virtual address 510 (e.g., bits at positions 47:39 of a 64-bit virtual address) for a corresponding PML4 entry (PML4E 521) that indicates a location of a page directory pointer table to be next walked (e.g., the PDPT 512). For convenience of illustration, the PML4E 521 points to an edge of the PDPT 512 as an example of how the PML4E 521 points to or identifies the base of PDPT 512.

After accessing the first table (PML4T 511), the table walker proceeds through the remaining tables following the pointers from each table entry selected by the next virtual address portion or subset to reach a subsequent table and, using a subsequent virtual address subset, a correct place in the subsequent table. That is, using corresponding subsets of bits 502-505 from the virtual address 510, the table walker walks each table 511-515 and locates an entry in the respective table that indicates a next table to be identified and accessed. By way of example, as illustrated, a third subset of bits 503 from the virtual address 510 (e.g., bits at positions 38:30) is used to locate a page directory pointer entry (PDPE) 522 in the PDPT 512. A fourth subset of bits 504 from the virtual address 510 (e.g., bits at positions 29:21) is used to locate a page directory entry (PDE) 523 in the PDT 513. A fifth subset of bits 505 from the virtual address 510 (e.g., bits at positions 20:12) is used to index a page table entry (PTE) 524 in the PT 514. In some embodiments, in accordance with the PTE 524 having an XPA memtype setting, using the same fifth subset of bits 505 (e.g., as index to the XPTE 525) a physical address is acquired from the XPT 515 (from the XPTE 525) and the table walker thereby acquires an address corresponding to the base of the particular physical memory page 516 having a four KB size as labeled "4 KB PAGE." This physical address combined with (for example concatenated with) virtual address 510 subset 506 (bits 11:0) forms the translated physical address of the desired virtual memory access. The page 516 is then used according to the XPAs of the XPTE 525 by the processing system 100 for the instruction scheduled for execution associated with the virtual address 510 or for the instruction actually being performed by the processing system 100. If the table walker is unable to find an address translation for the virtual address 510, an error-handling operation is performed (e.g., a page fault is generated and subsequently processed according to a page fault routine).

While a particular arrangement of tables 511-515 is illustrated in FIG. 5, in some embodiments a different number or size of tables, a different arrangement of tables, or a different number, size and arrangement of tables are used to similar effect to gain access to the XPTE 525 and bits of the XPAs therein. For example, in some embodiments, only a single table is used in place of the tables 511-515 and mapping of the virtual address 510 is performed against the single table and its entries to eventually reach and identify the physical memory page 516 and contents of this page 516.

Figure 6:
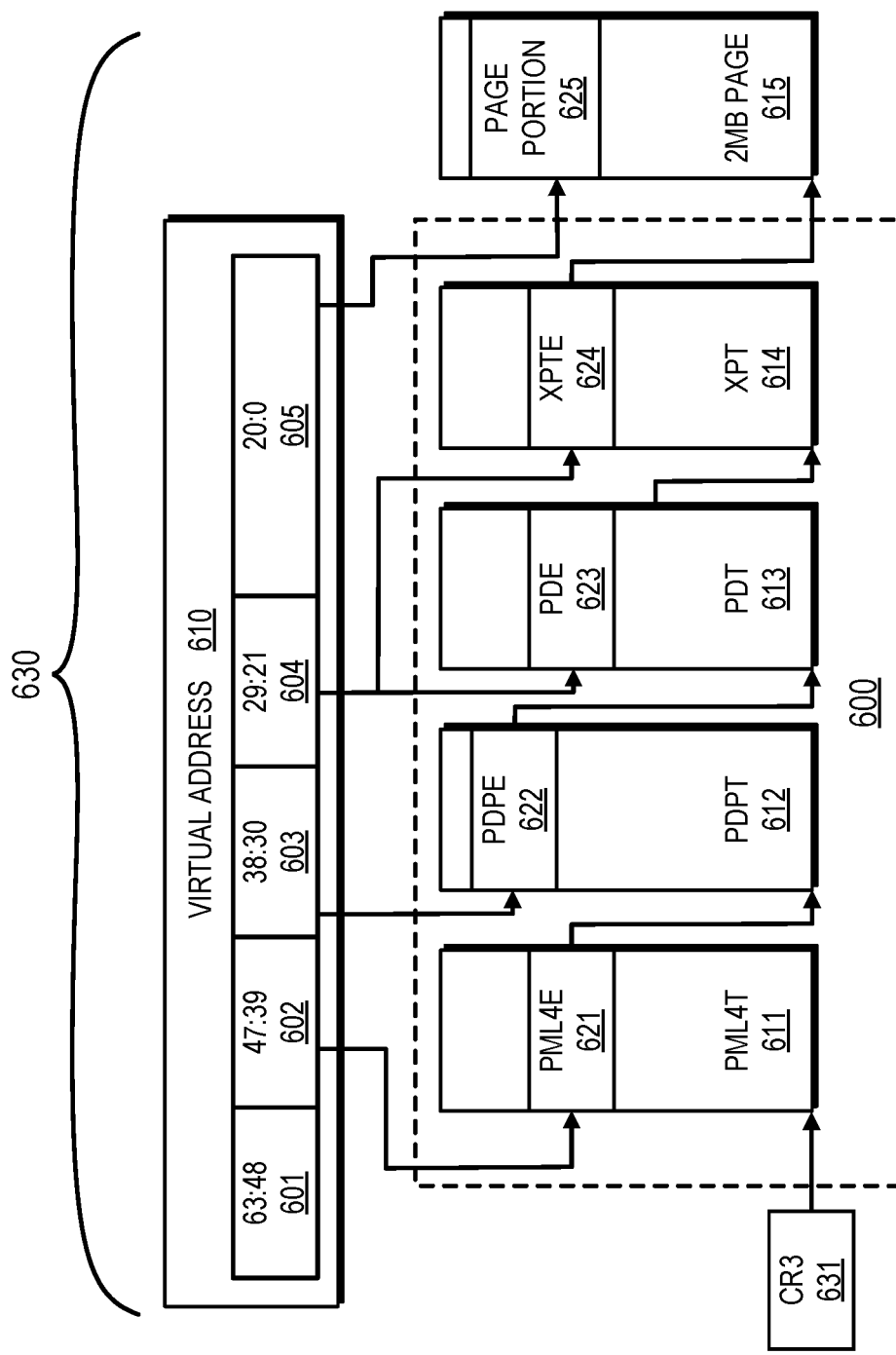
FIG. 6 is a block diagram of a page table set and paging hierarchy for an extended page attribute table-walk for a larger page size according to some embodiments.

FIG. 6 is a block diagram of a page table set 600 and a paging hierarchy 630 for an extended page attribute table-walk for a two MB size memory page 615 according to some embodiments. The page table set 600 includes four tables 611-614. The tables 611-614 illustrate how an XPT 614 is accessed through the modified virtual address mapping. While a set of four tables 611-614 is illustrated, some embodiments of the page table set 600 include a fewer or greater number of page tables that are implemented in a similar way to the arrangement of the tables 611-614.

The page table set 600 includes a page map level-4 table (PML4T) 611, a page directory pointer table (PDPT) 612, a page directory table (PDT) 613, and an extended page table (XPT) 614. The PML4T 611, the PDPT 612, the PDT 613, and the XPT 614 are data structures (e.g., tables, linked lists) that are stored in a memory such as the memories 105, 210. The PML4T 611, the PDPT 612, and the PDT 613 each include information about a subsequent table to be walked during a next step of a table-walk to find a physical address corresponding to a virtual address 610. For example, the PML4T 611 is a first table accessed and the PML4T 611 includes a number of entries, referred to as PML4Es 621. Each PML4E 621 includes information mapping address bits 602 from the virtual address 610 to page directory pointer tables such as the PDPT 612. The page table set 600 includes physical addresses indicating particular memory pages associated with corresponding subsets or portions of the virtual address 610 where the subsets are labeled as blocks 601-605. The memory page 615 is a specific page in memory, indicated by the virtual address 610, where data (e.g., data bits, instruction bits) are located.

In some embodiments, when performing a table-walk in the page table set 600, in order to acquire a physical address that is associated with the virtual address 610, a table walker (e.g., an MMU component, an MMU hardware device, an MMU-assist routine) first reads a control register 631 (e.g., a third control register labeled "CR3") to determine a location, in memory, of a page map level table (e.g., PML4T 611) associated with its corresponding virtual machine or process executing on the processing system. The PML4T 611 is a first table of the page table set 600 accessed during the table-walk. Using corresponding subsets of bits 602-604 from the virtual address 610, the table walker walks each table 611-614 and locates an entry in the respective table that indicates a next table to be walked. The table walker next accesses the PML4T 611 using a second subset of bits 602 from the virtual address 610 (e.g., bits at positions 47:39 of a 64-bit virtual address) for a corresponding PML4 entry (PML4E 621) that indicates a location of a page directory pointer table to be next walked (e.g., the PDPT 612). For convenience of illustration, the PML4E 621 points to an edge of the PDPT 612 as an example of how the PML4E 621 points to or identifies the base of PDPT 612. In some embodiments, a first subset of bits 601 from the virtual address 610 (e.g., bits at positions 63:48 of a 64-bit virtual address) is not used for the table-walk of the page table set 600 for the virtual address 610 and instead the first subset of bits 601 corresponds to bits reserved for other uses besides the table-walk. Hence, in this way, the first subset of bits 601 do not participate in address translation in such embodiments.

After accessing the PML4T 611, the table walker proceeds through the remaining tables 612-614 following the pointers from each table entry selected by the next virtual address subset to reach a subsequent table. By way of example, a third subset of bits 603 from the virtual address 610 (e.g., bits at positions 38:30) is used to locate a page directory pointer entry (PDPE) 622 in the PDPT 612. A fourth subset of bits 604 from the virtual address 610 (e.g., bits at positions 29:21) is used to locate a page directory entry (PDE) 623 in the PDT 613. The fourth subset of bits 604 from the virtual address 610 (e.g., bits at positions 29:21) is also used to locate an extended page table entry (XPTE) 624 in the XPT 614, in accordance with the PDE 623 having an XPA memtype setting.

Eventually, using a physical address acquired from the XPT 614 (e.g., with one or more bits from the XPTE 624), the table walker acquires an address for the particular physical memory page 615 having a 2 MB size as labeled "2 MB PAGE." For example, the XPTE 624 includes a base address of the physical memory page 615. This physical address combined with (for example concatenated with) virtual address 610 subset 605 (bits 20:0) then forms the translated physical address of the desired virtual memory access. The page 615 is then used according to the XPAs of the XPTE 624 by the processing system 100 for the instruction scheduled for execution associated with the virtual address 610 or for the instruction actually being performed by the processing system 100. If the table walker is unable to find an address translation for the virtual address 610, an error-handling operation is performed (e.g., a page fault is generated and subsequently processed according to a page fault routine).

While a particular arrangement of tables 611-614 is illustrated in FIG. 6 for the page table set 600, in some embodiments a different number of tables, a different arrangement of tables, or a different number and arrangement of tables is used to similar effect to identify and use the physical memory page 615. For example, in some embodiments, only a single table is used in place of tables 611-614 and mapping of the virtual address 610 is performed against the single table and its entries to reach and identify the physical memory page 615 and contents of the page 615 such as the page subset 625.

Figure 7:
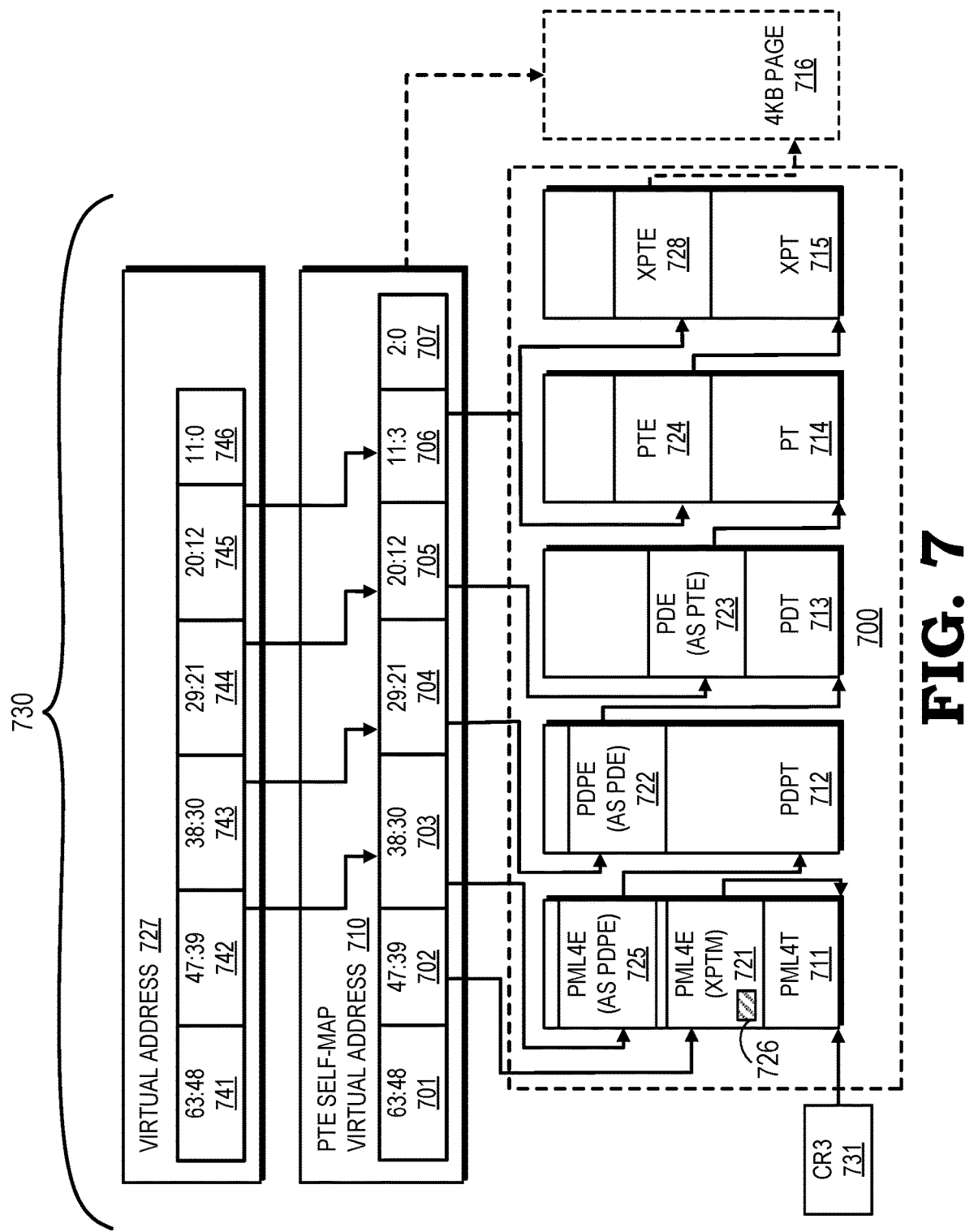
FIG. 7 is a block diagram of a self-map table-walk to access an extended page table entry for a relatively small page according to some embodiments.

FIG. 7 is a block diagram of a paging hierarchy 730 and self-map table-walk of an extended page table (XPT) 715 of a page table set 700 for a four KB size page 716 according to some embodiments. As used herein, the self-map table-walk refers to a mechanism for hardware or software to access the XPT 715 or other XPT without having to create a special set of page table entries for each separate XPT page. In terms of structures, in the paging hierarchy 730, the page table set 700 includes a page map level-4 table (PML4T) 711, a page directory pointer table (PDPT) 712, a page directory table (PDT) 713, a page table (PT) 714, and an extended page table (XPT) 715. The PML4T 711, the PDPT 712, the PDT 713, the PT 714, and the XPT 715 are data structures (e.g., tables, linked lists) that are stored in a memory such as the memories 105, 210. The PML4T 711, the PDPT 712, the PDT 713, and the PT 714 each include information about a subsequent table to be walked during a next step of a table-walk in combination with bits of a PTE self-map virtual address 710. While a set of five tables 711-715 is illustrated, some embodiments of the page table set 700 include a fewer or greater number of page tables that are implemented in a similar way to the arrangement of the tables 711-715.

In the course of managing system memory, an OS (not illustrated) needs to read or operate on the various table entries at any level of the tables 711-715, for example to read or set table link pointers or to assign various page attribute values, and the OS accesses these items using virtual addressing. A simple approach includes assigning ranges of virtual addresses to map to the tables 711-715 to provide this access. However, a more efficient approach uses a self-mapping capability that does not require such additional virtual address mappings. This is accomplished using an entry PML4E 721 in the first table PML4T 711 that is set to point to PML4T 711 rather than a second table in the hierarchy such as PDPT 712, herein referred to as a self-map PML4E. One mechanism to do so includes use of an XPTM attribute 726 in the PML4E 721 that is encoded as a bit or set of bits where the "M" refers to "self-map." For a given virtual address 727 having subsets 741-746, in the absence of an XPTM attribute set in PML4E 721, its associated PTE 724 is accessed by shifting the virtual address 727 right by one index subset and setting upper index subset 702 to select the self-map PML4E 721, forming the PTE self-map virtual address 710, and using that address 710 to reference memory. In detail, for example, subset 742 is shifted to a third subset 703, subset 743 is shifted to a fourth subset 704, subset 744 is shifted to a fifth subset 705, and subset 745 is shifted to a sixth subset 706. Subset 746 of the virtual address 727 is not shifted and subset 746 and a seventh subset 707 of the PTE self-map virtual address 710 are used for purposes other than shifting.

In performing the translation of this self-map virtual address 710 for a read or write access to memory, the table-walk iterates on the first table PML4T 711 and consequently references table PML4T 711 for the second step in the table-walk as well, this time using a third PTE self-map virtual address 710 subset 703 for the index, in effect using PML4E 725 as a PDPE. The PML4E 725 in turn points to PDPT 712 as the third level table, treating the PDPT 712 as a PDT, which is indexed with a fourth self-map virtual address 710 subset 704. The table-walk proceeds using PDT 713 as the fourth level table and self-map virtual address 710 subset 705 as the index. This fourth step of translation returns, from PDE (as PTE) 723, the pointer to PT 714, which combined with next self-map virtual address subset 706 gives a final physical address of the memory access pointing to PTE 724, which is then read or written as a target memory operand. This method, however, only provides access to the PTE and not an associated XPTE.

In accordance with some embodiments, PML4E 721 contains the XPTM attribute 726, which designates the access as the self-map access with an extended page attribute table (XPT) such as the XPT 715 at the end of the table-walk. In response to starting an address translation table-walk at a PML4E with this XPTM designation, the MMU table walker, upon reaching a PDE (as a PTE) 723, performs one additional step of the table-walk by indexing the table pointed to by a PDE (as a PTE) 723 using a self-map virtual address 710 subset 706 to read the PTE 724, extract the table link contained therein and form the final physical address for the memory access from that link, pointing to the XPT 715, indexed by self-map virtual address 710 subset 706. This physical address points to an XPTE 728 as the target of the access. Accordingly, an OS accesses the PTE by using a self-map PML4E that does not have the XPTM attribute set, and accesses the corresponding XPTE by either setting the XPTM attribute 726 in the self-map PML4E 721, or alternatively by using a different self-map PML4E that has the XPTM attribute set. In the latter case, PML4T 711 would include two self-map PML4Es at different indices, and the OS would insert the appropriate index into the PTE self-map virtual address 710 to access either the PTE 724 or the XPTE 728, rather than setting or clearing the XPTM attribute in a single PML4E.

The paging hierarchy 730 illustrates one particular mechanism to access an XPT such as the XPT 715. Software, such as an OS, maintains a one-to-one association between the XPT 715 and its associated leaf page table as an embodiment of the page table 714. Bits 11:3 of the 64-bit virtual address 710 (subset 706) for the memory page 716 are used to select the PTE 724 of the page table 714 from which to get the XPT pointer during the table-walk. Access to the XPTE is granted if its corresponding PTE is marked valid (such as by way of the OS). When using the XPT self-map mechanism, the software, such as the OS, swaps out the PTE 724 after the XPTE as follows. For swapping out a page from a memory, a set of steps of a first procedure includes: (1) changing XPTE.P to a zero value (0) to indicate that the extended page table entry is no longer available, (2) saving the XPTE, and (3) changing the PTE.P to a zero value (0) to indicate that the page table entry is no longer available. The ".P" of the XPTE.P refers to a field of one or more bits where its name or designation is "P" and the period separates the XPTE as an entry from its various fields such as ".P". For swapping a page into memory, a set of steps of a second procedure includes: (1) changing PTE.P to a one value (1) to indicate that the extended page table entry is available, (2) writing the XPTE, and (3) changing the XPTE.P to a one value (1) to indicate that the extended page table entry is available. In operation, a memory access to a memory page with XPTE.P having a zero value (0) results in a page fault (abbreviated #PF) and using a new error bit to indicate that a search for the non-available XPTE is not valid at that time.

Figure 8:
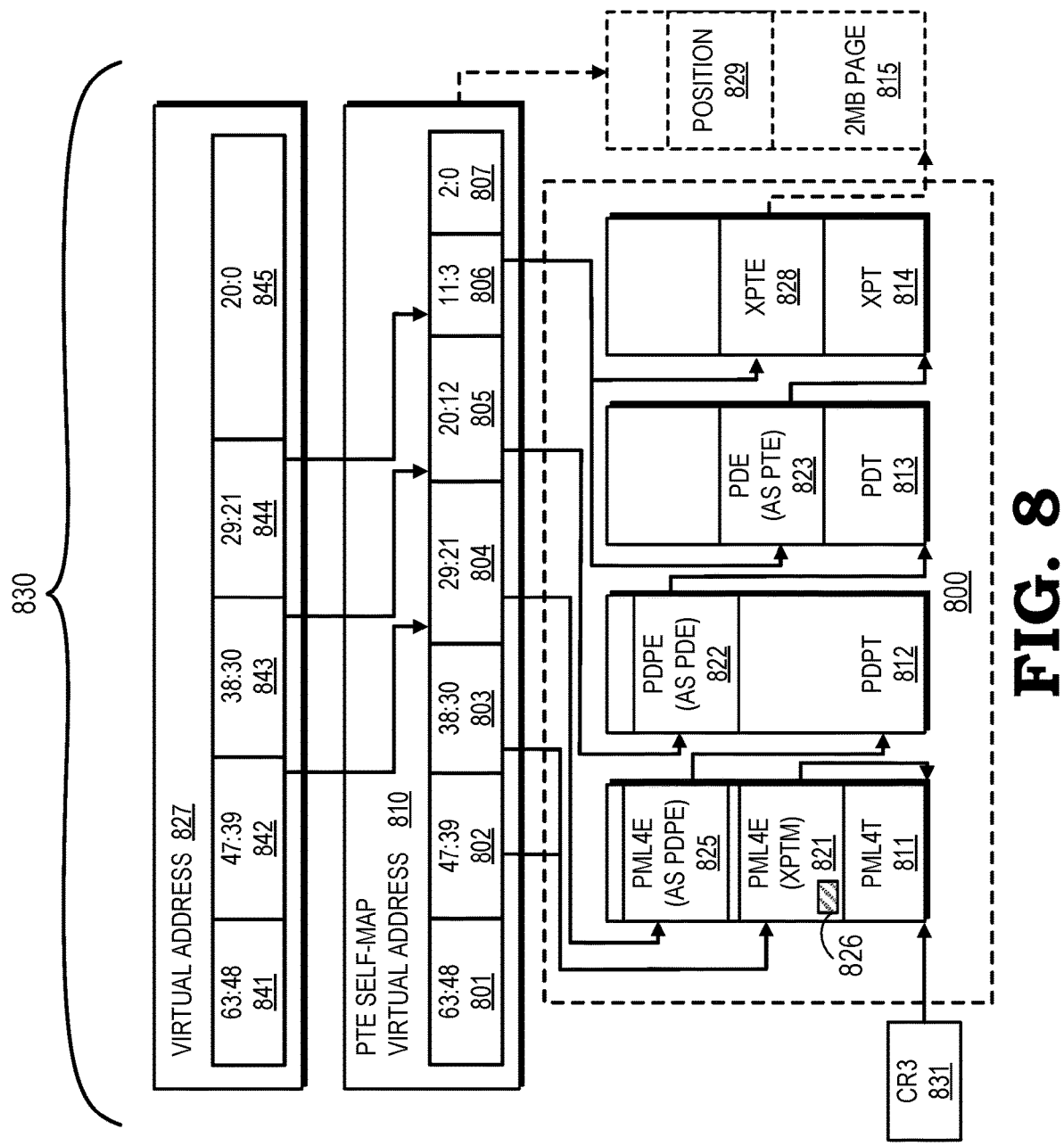
FIG. 8 is a block diagram of a self-map table-walk to access an extended page table entry for a larger page according to some embodiments.

FIG. 8 is a block diagram of a paging hierarchy 830 and self-map table-walk of an extended page table (XPT) 814 of a page table set 800 for a two MB size page 815 according to some embodiments. For structures in the paging hierarchy 830, the page table set 800 includes a page map level-4 table (PML4T) 811, a page directory pointer table (PDPT) 812, a page directory table (PDT) 813, and the XPT 814. The PML4T 811, the PDPT 812, the PDT 813, and the XPT 814 are data structures (e.g., tables, linked lists) that are stored in a memory such as the memories 105, 210. The PML4T 811, the PDPT 812, and the PDT 813 each include information about a same table or a subsequent table to be walked during a next step of a table-walk based on bits of a PTE self-map virtual address 810. While a set of four tables 811-814 is illustrated, some embodiments of the page table set 800 include a fewer or greater number of nested or non-nested page tables that are implemented and used with allied structures in a similar way to the arrangement of the tables 811-814.

The paging hierarchy 830 illustrates a particular mechanism to access an XPT such as the XPT 814. In the course of managing system memory, the OS (not illustrated) needs to read or operate on the various table entries at any level of the tables 811-814, for example to read or set table link pointers or to assign various page attribute values, and the OS accesses these items using virtual addressing. A simple approach includes assigning ranges of virtual addresses to map to the tables 811-814 to provide this access. However, a more efficient approach uses a self-mapping capability that does not require such additional virtual address mappings. This is accomplished using a first PML4T entry PML4E 821 in the first table PML4T 811 that is set to point to PML4T 811 a second time and a third time rather than to a second table (PDPT 812) in the hierarchy 830 (after accessing the first table PML4T 811). A second and third access is illustrated as a self-map PML4E 825.

An index to the PML4E 821 is inserted into second and third subsets 802 and 803 of the PTE self-map virtual address 810, based on bits of a virtual address 827, so the table-walk uses PML4T 811 three times, then looks up an entry, PDPE 822, in the PDPT 812 using another (fifth) subset 805 of the PTE self-map virtual address 810. For sake of illustration, the virtual address 827 is divided into a first subset 841, a second subset 842, a third subset 843, a fourth subset 844, and a fifth subset 845. Subsequent to use of the PML4T 811, the table-walk uses a table address from the PDPE 822 and another (sixth) subset 806 of the PTE self-map virtual address 810 to read a PDE 823 in the PDT 813. Because the table-walk starts at a PML4E with an XPTM attribute, the table-walk does one more step by reading the PDE 823 to acquire a base address to the XPT 814, which, combined with the sixth subset 806, forms a physical address for a memory reference to an entry in the XPT 814 referred to as XPTE 828. A seventh subset 807 is not used for reference to the tables 811-814.

One mechanism to perform the self-mapping includes accessing and interpreting an XPTM attribute 826 in one of the PML4T entries such as the first PML4E 821. The XPTM attribute 826 is encoded as one or more bits. For the virtual address 827, in the absence of an XPTM attribute set in the PML4E 821 (e.g., a value of "1" in a single bit), its associated PDE 823 (as PTE) is accessed by shifting to the right certain subsets of bits of the virtual address 827. In the self-mapping mechanism, subsets 842-844 of the virtual address 827 are shifted right by one or more index subsets, the upper index subsets 802, 803 are set to select entries in the PML4T 811 such as the self-map PML4E 821. The PTE self-map virtual address 810 is formed based on the virtual address 827. One or more bits of the virtual address 827 and the PTE self-map virtual address 810 are used to reference memory (e.g., the 2 MB size memory page 815 in the memory 105 or the memory 210). As illustrated, the second subset 842 of the virtual address 827 is shifted to a fourth subset 804 of the PTE self-map virtual address 810, the third subset 843 of the virtual address 827 is shifted to the fifth subset 805 of the PTE self-map virtual address 810, and the fourth subset 844 of the virtual address 827 is shifted to the sixth subset 806 of the PTE self-map virtual address 810.

In performing the translation of the PTE self-map virtual address 810 for a read or write access to memory, the table-walk iterates on the first table PML4T 811 and consequently references table PML4T 811 for the second step and third step in the table-walk using other subsets (e.g., the fourth subset 804, the fifth subset 805) of PTE self-map virtual address 810 for the index, in effect using another entry, illustrated as PML4E 825, as a PDPE. The PML4E 825 in turn points to PDPT 812 as a third level table PDT, treating the PDPT 812 as the PDT, which is indexed with another (e.g., the fifth subset 805) subset of the PTE self-map virtual address 810. The table-walk proceeds using PDT 813 as a fourth level table and a subsequent PTE self-map virtual address 810 subset (e.g., the subset 806) as the index. This fourth step of translation returns, from PDE (as PTE) 823, a pointer to the XPT 814, which combined with a self-map virtual address subset gives a physical address of the memory access. The physical address is then read or written as a target memory operand.

The XPTM bit or set of bits as XPTM attribute 826 is, for example, a previously unused bit in the particular set of PML4E bits in the PML4Es in the PML4T 811 such as a bit in the PML4Es previously designated to be in a must-be-zero (MBZ) state or a bit reserved for a custom use as known in the art. In the PML4T 811, existing PML4E mapping is unaffected, and a new or updated PML4E 821 is created for accessing the XPT 814.

To start the table-walk, in order to access XPAs in an XPTE 828 in the XPT 814 for the two MB size memory page 815, a table walker (e.g., an MMU unit, MMU hardware component) first reads a control register 831 (e.g., a third control register labeled "CR3") to determine a location, in memory, of the first table PML4T 811 associated with its corresponding virtual machine or process executing on the processing system 100. A first subset of bits 801 from the PTE self-map virtual address 810 (e.g., bits at positions 63:48 of a 64-bit virtual address) is not used for the table-walk of the page table set 800 for the PTE self-map virtual address 810 and instead corresponds to bits reserved for other purposes. A memory position 829 (e.g., a cache line, a block of memory, a set of bytes, a set of bits) in the 2 MB size page 815 is accessed based on bits of the virtual address 827 and the PTE self-map virtual address 810 compatible with the paging hierarchy 830.

Figure 9:
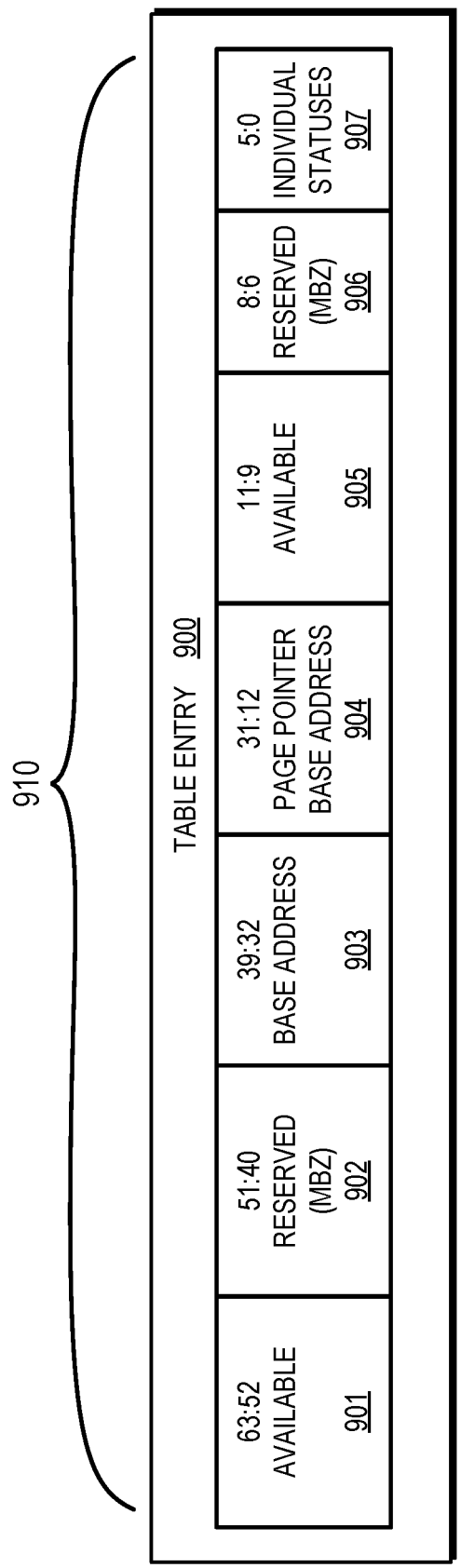
FIG. 9 is a block diagram of a page table entry format according to some embodiments.

FIG. 9 is a block diagram of a page table entry format according to some embodiments. A page table entry 900 is representative as entries such as the entries 521-525, 621-624, 721-725, and 821-823. The page table entry 900 includes 64 bits indexed over a bit range 910 indicated over index numbers 63 to 0. The page table entry 900 shows an example of paging table entries that are used in a paging system like the processing system 100. Generally, in addition to storing a pointer to another paging table or to a page of physical memory, each paging table also stores status information about the page or paging table being pointed to by the entry 900. Thus, in the entry 900 shown in FIG. 9, each entry contains several status bits or groups of bits representing or coding for a particular status or other address.

As illustrated, a seventh group of bits 907 labeled individual statuses stores various states associated with a page. For example, while not labeled, one of the group of bits 907 is a global (G) status bit, which indicates whether or not a particular page is global. In this group of bits 907, an accessed (A) bit indicates whether or not a page or page table has been accessed. A dirty (D) bit indicates whether the page of physical memory has been written to or not. One of the group of bits 907 is a page attribute table (PAT) bit. A "PCD" bit indicates whether the page or paging table is cacheable or not. A "PWT" bit indicates a caching policy for the page or page table. For example, PWT indicates whether the write-through or write-back caching is enabled. A "U/S" bit indicates user or supervisor privileges for a page or, if the table entry 900 includes a pointer to another page table, a group of pages. A read/write bit in the seventh group of bits 907 specifies read/write privileges for the page or, if the table entry 900 contains a pointer to a page table, a group of pages. In the group of bits 907, a present bit indicates whether or not the page or page table currently resides in physical memory. If P bit indicates that the page or page table is not present in a main memory, a page fault (PF) exception is generated and the page will need to be retrieved from a secondary storage.

Certain bits in the table entry 900 are available for other uses. For example, bits at positions 63:52 in a first group of bits 901 and bits at positions 11:9 in a fifth group of bits 905 are labeled "Available" and are used by software operative in the processing system 100. Generally, the table entry 900 is compatible with older x86 page entry definitions or layouts.

In the table entry 900, some of the bits are reserved in order to allow a same system to be compatible with other implementations using a larger addressable physical memory. For example, bits at positions 51:40 and 8:6 in the second and sixth groups of bits 902, 906 are reserved. As an amount of addressable physical memory increases over time with increased addressable memory, more of the reserved bits are used, or are required, to specify certain physical addresses of the paging tables and pages of physical memory that are located anywhere within a certain available physical memory. For example, in some embodiments, each paging table entry 900 uses all of bits 51:12 for the pointer to a paging table base address. However, in the embodiment shown, bits 39:12 in a third and a fourth group of bits 903, 904 are used. As illustrated, a 40-bit physical address is supported. In some embodiments, suitable physical address sizes are supported by reserving an appropriate number of bits for physical addresses. In the illustrated embodiment, the reserved bits are set to zero (referred to as the MBZ state).

In at least some embodiments, setting a page size bit in the page table entry 900 controls a size of pages (e.g., 4 kilobytes (KB), 8 KB, 1 megabit (MB), 2 MB) in physical memory that the virtual addresses are mapped to. For example, an embodiment enables a choice between 4 KB size pages and 2 MB size pages. Thus, in such an embodiment, a page size bit equal to one (1) indicates that 2 MB pages are being used and that the page directory entry contains a pointer to a base address of a page of physical memory or to another table, and a page size bit equal to zero (0) indicates that the page directory entry contains a pointer to a page table or to another table and that 4 KB pages are being used. Other registers in the processing system 100 control the size of physical pages used. For example, one or more bits in a fourth control register (CR4) controls the page sizes. When multiple registers in the processing system 100 are used for size, three or more sizes of pages are offered.

Figure 10:
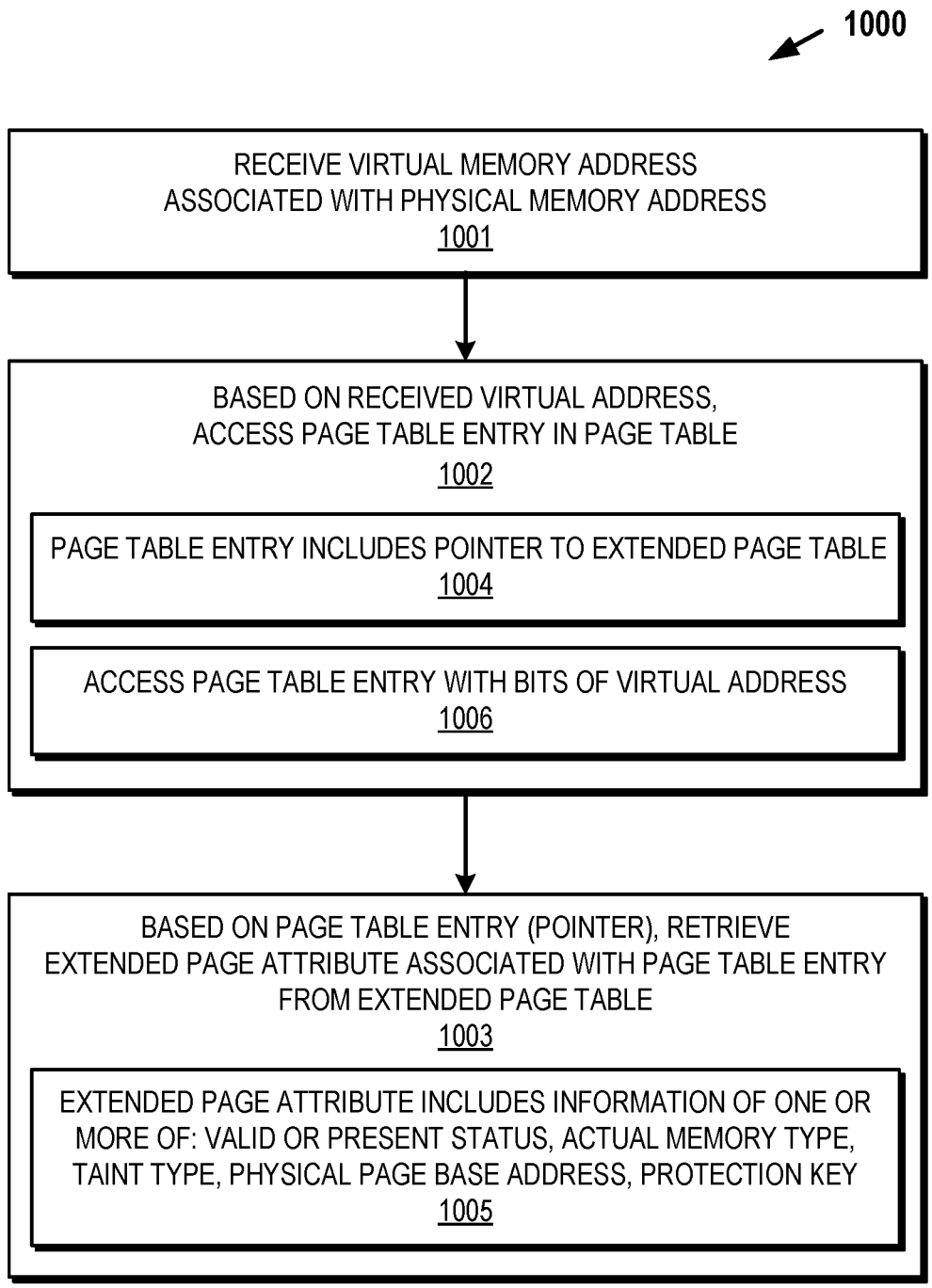
FIG. 10 is a block diagram of a method for accessing a physical memory page and an extended page attribute according to some embodiments.

FIG. 10 is a block diagram of a method 1000 for accessing a physical memory page and an extended page attribute according to some embodiments. At block 1001, a virtual memory address associated with a physical memory address is received. At block 1002, based on the received virtual address, a table walker accesses a page table entry in a page table. In some embodiments, at block 1004, a page table entry includes a pointer to an extended page table. At block 1006, the access to the page table entry is by way of use of bits of the virtual memory address. At block 1003, based on page table entry (pointer), the extended page attribute associated with a page table entry from extended page table is retrieved. In some embodiments, at block 1005, the extended page attribute includes information of one or more of: a valid or present status, an actual memory type, a physical page base address, and a protection key.

In some embodiments, the system and techniques described above are implemented in and include one or more integrated circuit (IC) devices (also referred to as integrated circuit packages or microchips), such as the processing system described above with reference to FIGS. 1-10. Certain aspects of the techniques described above are implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device is not always required, and that one or more further activities are not always performed, or elements included, in addition to those described. Still further, the order in which activities are listed are not necessarily the order in which they are performed. Also, the concepts have been described with reference to specific embodiments. However, one of ordinary skill in the art appreciates that various modifications and changes are made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:
1. A processing system, comprising:
a processor core; and
a memory management unit (MMU) configured to:
store a page table set in a memory accessible by the processing system, wherein:
at least a first page table of the page table set is configured as a non-extended page table and a last page table of the page table set is configured as an extended page table, and
the extended page table includes an extended page table entry having extended page table attributes associated with a physical memory page;
receive a request to translate a virtual address into a physical address associated with the physical memory page; and
using a same set of bits of the virtual address, access a pointer to the extended page table entry in a non-extended page table of the page table set and retrieve an extended page attribute of the physical memory page from the extended page table entry based on the pointer.

2. The processing system of claim 1, wherein:
the request to translate the virtual address is based on an access request from a software instruction operative in the processing system.

3. The processing system of claim 1, wherein:
the request to translate the virtual address is based on an access request from a virtual machine operative in the processing system.

4. The processing system of claim 1, wherein:
the MMU is further configured to:
retrieve at least a subset of the physical address to the physical memory page from bits of an extended page attribute of the extended page table entry.

5. The processing system of claim 1, wherein:
an association between the physical memory page and the extended page table is maintained by an operating system operative in the memory accessible by the processing system.

6. The processing system of claim 5, wherein:
the processing system includes an extended page table memory type field;
the extended page table memory type field stores a value in one or more bits to communicate to the operating system to use the extended page table for the extended page table entry; and
the extended page table memory type field is designated in one of a set of programmable processor-model-specific registers.

7. The processing system of claim 1, wherein:
a size of the physical memory page is approximately 2 megabytes; and
at least 21 bits of the virtual address are used to provide access to a subset of the physical memory page.

8. The processing system of claim 1, further comprising:
a page table base address register; and
wherein the MMU is further configured to:
use bits from the page table base address register to initiate a table-walk to the extended page table entry.

9. The processing system of claim 1, wherein the extended page table entry includes bits designated for a protection key for controlling access to the physical memory page.

10. The processing system of claim 1, wherein:
at least a subset of the bits of the extended page table entry points to the physical memory page.

11. The processing system of claim 1, further comprising:
one or more extended self mapping (XPTM) bits as an XPTM attribute located in a first page table of the page table set accessible by a software instruction operative in the processing system.

12. A method, comprising:
- receiving, at a memory management unit of a processing system, a request to translate a virtual address into a physical address associated with a physical memory page in a memory of the processing system;
- performing a table-walk through tables of a page table set for the physical memory page to identify an extended page table of the page table set, wherein a first page table accessed by the table-walk is a non-extended page table of the page table set and a last table accessed by the table-walk is the extended page table; and
- based on a same set of bits of the virtual address, accessing a pointer to the extended page table in a non-extended page table of the page table set and, from the extended page table, retrieving an extended page attribute associated with the physical memory page based on the pointer, wherein the extended page attribute includes at least a subset of the physical address of the physical memory page.

13. The method of claim 12, wherein determining that the page table set for the physical memory page includes an extended page table includes determining a value of one or more extended self mapping (XPTM) bits located in a first page table of the page table set.

14. The method of claim 12, further comprising:
- using a base address from a page directory base register, obtaining the pointer to the extended page table by performing the table-walk through a table hierarchy of the page table set to reach the extended page attribute.

15. The method of claim 12, wherein the extended page attribute includes information of one or more of: a valid status, a present status, an actual memory type and a protection key.

16. The method of claim 12, wherein receiving the request to translate the virtual address into the physical address is from an access request from a virtual machine operative in the processing system.

17. The method of claim 12, further comprising:
- maintaining an association between the physical memory page and an extended page table entry of the extended page table by an operating system operative in the memory of the processing system.

18. A non-transitory computer-readable storage medium that stores instructions readable by a processing system to cause the processing system to:
- receive a request to translate a virtual address into a physical address associated with a physical memory page in a memory of the processing system;
- perform a table-walk through page tables of a page table set for the physical memory page, wherein the table-walk first accesses a non-extended page table and subsequently accesses an extended page table of the page table set using a same set of bits from the virtual address; and
- based on accessing the extended page table, retrieve an extended page attribute from an extended page table entry of the extended page table, wherein the extended page attribute includes at least a subset of the physical address of the physical memory page.

19. The non-transitory computer-readable storage medium of claim 18, the instructions further causing the processing system to:
- using a base address from a page directory base register, obtain a pointer to the extended page table by performing the table-walk through a table hierarchy of the page table set to reach the extended page attribute.

\* \* \* \* \*